United States Patent
Currans et al.

(12) 
(10) Patent No.: US 6,980,311 B1
(45) Date of Patent: Dec. 27, 2005

(54) METHOD AND APPARATUS FOR MODIFYING TEMPORAL ADDRESSES

(75) Inventors: Kevin G. Currans, Philomath, OR (US); Aloke Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/536,862

(22) Filed: Mar. 27, 2000

(51) Int. Cl.[7] ............................ G06F 13/00; G06F 3/12
(52) U.S. Cl. ...................... 358/1.15; 358/1.18
(58) Field of Search .................. 358/1.15, 1.9, 358/1.14, 1.13, 500, 401; 709/4–10; 710/250, 710/350

(56) References Cited

U.S. PATENT DOCUMENTS

| | | |
|---|---|---|
| 6,029,175 A | 2/2000 | Jacobstein et al. |
| 6,269,370 B1 * | 7/2001 | Kirsch ........................ 707/10 |
| 6,638,314 B1 * | 10/2003 | Meyerzon et al. .......... 715/513 |

FOREIGN PATENT DOCUMENTS

| | | | |
|---|---|---|---|
| EP | 0834822 A | 4/1998 |
| EP | 0869652 A | 10/1998 |
| EP | 1006466 A | 6/2000 |
| GB | 2328300 A | 2/1999 |
| WO | WO0076198 A | 12/2000 |

* cited by examiner

*Primary Examiner*—Douglas Tran
(74) *Attorney, Agent, or Firm*—Timothy F. Myers

(57) ABSTRACT

A document delivery system retrieves a periodically changing document. First, an address for the document is obtained. Next a temporal field is located within the address. The temporal field of the address is then modified to reflect a new instance. Then using the modified address, an updated document is retrieved.

12 Claims, 6 Drawing Sheets

| | |
|---|---|
| mmddyy | yymmdd |
| mmddyyyy | yyyymmdd |
| mmdd | /yy/mm/dd |
| /mm/dd/yy | /yyyy/mm/dd |
| /mm/dd/yyyy | yy-mm-dd |
| /mm/dd | yyyy-mm-dd |
| mm-dd-yy | DDDD,MMMM dd,yyyy |
| mm-dd-yyyy | DDDD dd MMMMM,yyyy |
| mm-dd | |
| ddmmyy | |
| ddmmyyyy | |
| ddmm | |
| /dd/mm/yy | |
| /dd/mm/yyyy | |
| /dd/mm | |
| dd-mm-yy | |
| dd-mm-yyyy | |
| dd-mm | |

Fig. 6

METHOD AND APPARATUS FOR MODIFYING TEMPORAL ADDRESSES

FIELD OF THE INVENTION

This invention relates to the printing field. More particularly, this invention is a document delivery system for automatically printing a document on a printing device.

BACKGROUND OF THE INVENTION

With the advent of the Internet, millions of publications and documents (typically web pages) are available for perusal. However, most users do not need, nor desire, to read every publication that is available on the Internet. Several different services have been created which allow users to search, organize, store, display, or print requested documents. One such service is Hewlett-Packard's (HP) Instant Delivery Utility. Instant Delivery includes software running on a user's computer or other electrical device that provides a novel method of retrieving information from content providers on the Internet. Instant Delivery fetches publications from the content providers at predetermined scheduled times and sends them directly to a printer or other recording device, without requiring the user to be present. The user can manage the deliveries by manipulating a "delivery list" in the utility.

Instant Delivery provides a "publication catalog" that contains magazines, newspapers, and special websites specially designed by content providers for exclusive use with Instant Delivery. The utility and publication catalog work together to allow the user to subscribe for, and receive, publications that are delivered directly to the user's printer at predetermined times. The utility keeps track of when deliveries are due, then logs onto the Internet, fetches the publication, and sends it to the printer even when the user is not present.

While services such as Instant Delivery can deliver some web pages from the Internet, not all web pages on the Internet can be printed. Those web pages that require user interaction such as login or passwords cannot be delivered by HP's Instant Delivery. Further, web documents added to Instant Delivery must have a universal resource locator ((URL), its Internet address) that remains the same for every issue.

For publishing purposes, however, the ability to print daily material is invaluable. Currently, Instant Delivery requires content providers within the publication catalog to continually update or refresh their web pages stored at fixed URL addresses. Currently, there is no way to automatically retrieve URLs that contain a temporal field, such as datestrings and timestrings. If content providers could include temporal fields in the URLs, they can simplify their archival process for past issues. Further, by having temporal fields incorporated within the URLs, many other web documents that are periodically updated on the Internet can be requested by Instant Delivery without their inclusion into the publication catalog. Thus, web sites that are periodically changing and of interest to the user, can be retrieved and printed similarly as documents supplied by content providers. Further, content providers can change the organization of their web sites to allow for more efficient archiving and to provide access to "back issues."

Indeed, many web publications now on the Internet do incorporate a temporal field such as a datestring in their URLs. However, there is no standard practice for doing so and multiple methods of incorporating the temporal field exist. The temporal field inclusion in URLs is done broadly in one of two ways. If the URL is "static", that is it points to a fixed web page, the temporal field is incorporated into the path of the web page within the URL. If the URL is "dynamic", this is it incorporates parameters to be passed to an interactive program, the temporal field is usually included within or is one of the parameters. The following exemplary URLs illustrate static and dynamic methods for incorporating a datestring.

STATIC: http://www2.uclick.com/ucrossword/daily/99/12/30/puzpic.gif

DYNAMIC: http://www2.uclick.com/ucrossword/daily/puzpic.gif?day=991230.

The next day (Dec. 31, 1999) would accordingly be:

STATIC: http://www2.uclick.com/ucrossword/daily/99/12/31/puzpic.gif

DYNAMIC: http://www2.uclick.com/ucrossword/daily/puzpic.gif?day=991231.

One problem with temporal fields such as the datestring field is that it can be incorporated into the URL in an almost unlimited combination of possibilities.

SUMMARY

A document delivery system retrieves a periodically changing document. First, an address for the document is obtained. Next, a temporal field is located within the address. The temporal field of the address is then modified to reflect a new instance. Then using the modified address, an updated document is retrieved.

BRIEF DESCRIPTION OF THE DRAWINGS

FIG. 6 is an exemplary list of possible temporal patterns stored in a database.

DETAILED DESCRIPTION OF THE EMBODIMENTS

One aspect of the invention includes an algorithm that searches an address of a document to determine if a temporal field exists. If the address is a Universal Resource Locator (URL) that points to a web page on the Internet, the URL may be either a static or a dynamic URL which incorporates the temporal field. Once a temporal field is identified, the invention calculates an updated temporal field based upon a predetermined instance interval. The temporal field types include datestrings, timestrings, and other time related patterns such as weekly and monthly intervals. The invention allows software utilities such as HP's Instant Delivery program to retrieve periodically updated web pages on the Internet not under HP's Instant Delivery's control by intelligently modifying a URL that contains a temporal field.

Another aspect of the invention allows for multiple URLs of a requested web page to be analyzed to determine non-standard unique temporal related patterns. Once the unique pattern has been determined, the identified pattern is added to a list of patterns used to scan other requested URLs. If a temporal field is included in a dynamic URL, a further aspect of the invention generates the updated URL for use by Common Gateway Interface (cgi) scripts as well as other interactive programs such as active server pages (vbscript by Microsoft) and Java server pages, to name a couple.

Figure 1:
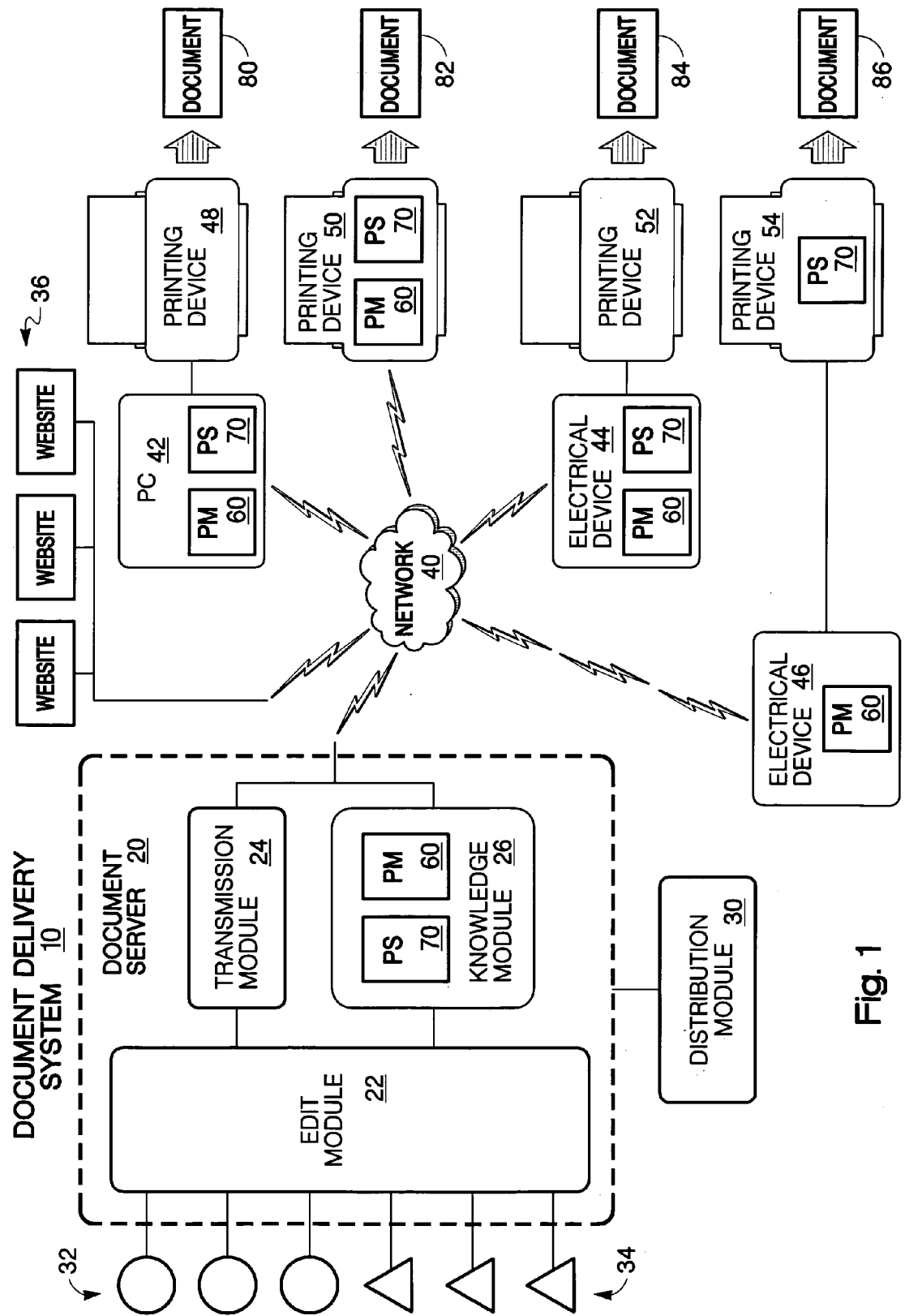
FIG. 1 is an exemplary embodiment of a document delivery system incorporating at least one aspect of the invention.

FIG. 1 is an exemplary block diagram of a document delivery system 10 that incorporates the ability to retrieve documents that have unique addresses that incorporate temporal fields. The document delivery system is similar to that described in U.S. patent application Ser. No. 09/325,040, filed Jun. 7, 1999 and commonly assigned to the same assignee as the present application and is incorporated herein by reference.

In FIG. 1, a document server 20 includes an edit module 22, a transmission module 24, and a knowledge module 26. Edit module 22 is used to provide the publication catalog to the user. The user can select from several content providers 32. The edit module 22 also incorporates ad content from ad providers 34. Document server 20 is preferably a HP-UX server such as an HP9000 server sold by Hewlett-Packard Company, however other servers using Microsoft NT or Sun Microsystems Solaris operating systems, for example, can be substituted by those skilled in the art and still meet the spirit and scope of the invention. Document server 20 is also coupled to a distribution module 30 and a network 40. The network 40 is preferably the Internet, although other networks such as an inter-office intranet, a local area network, and other public and private networks of the wired or wireless types can be combined or substituted to form the network and still meet the spirit and scope of the invention.

The network 40 is also preferably but optionally coupled to external devices such as personal computer (PC) 42, printing device 50 and electrical devices 44/46. Electrical devices 44/46 include other non-PC based equipment such as information appliances, personal data assistants, interactive TVs, and set top boxes, to name a few. Further, the network is also connected to various document servers such as web sites 36.

Printing module (PM) 60 is shown as being locatable in either the knowledge module 26, the personal computer 42, printing device 50, electrical devices 44/46 or any combination thereof. The printing scheduler (PS) 70 is likewise locatable with the knowledge module 26, PC 42, printing device 50, electrical devices 44/46 or any combination thereof. The printing module 60 monitors the printing schedule 70 to determine if a document 80/82/84/86 should be requested from document server 20 or from other sources such as web sites 36. When the print module 60 determines that a document 80/82/84/86 should be requested from document server 20 or web sites 36, the print scheduler 70 automatically requests the document 80/82/84/86 without user intervention from document server 20 or web sites 36. Depending on the location of print manager 60, the requested document 80/82/84/86 is either pushed or pulled to the PC 46, printing device 50, or electrical devices 44/46. Assuming that the requested document 80/82/84/86 is available, the print scheduler 70 generates and sends the document 80/82/84/86 to print manager 60. When print manager 60 receives the requested document 80/82/84/86, it is printed preferably without user intervention. The term "without user intervention" means that a user is not directly involved in the printing operation. That is, the requested document 80/82/84/86 is sent automatically to print manager 60 to be printed out by printing device 48/50/52/54 or distributed by distribution module 30. Therefore, the user does not need to be press any "print" buttons or otherwise be directly involved in the printing process. In fact, the user may not even be present in the same room, city, state, or country as the printing devices 48/50/52/54 during the printing operation. That is, the printing operation automatically occurs in an unattended state regardless of whether the user is present or not.

Figure 2:
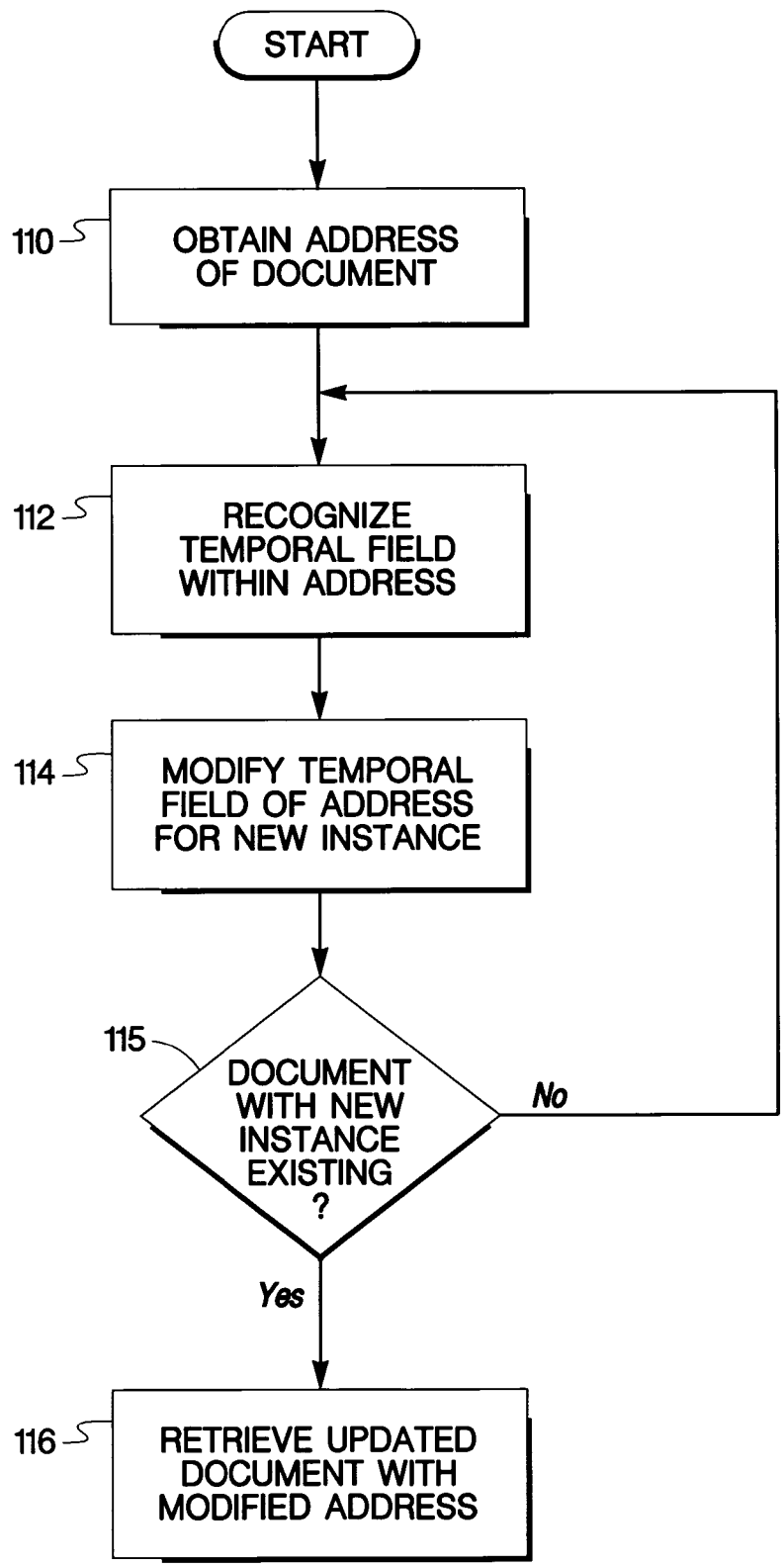
FIG. 2 is an exemplary flow chart of the method used to retrieve a constantly changing document in the document delivery system of claim 1.

FIG. 2 is an exemplary flowchart of the additional steps performed by the print scheduler 70 after it receives a request for a document 80/82/84/86 from print module 60. In block 110, the address of the document 80/82/84/86 is obtained. Preferably the address is a URL address of a web site location on the Internet but optionally it could be a filename location of a document 80/82/84/86 on document server 20 or other devices with file systems on the network. After the address is scanned to recognize if any temporal field is present within the address. In block 114, assuming a temporal field is found, the temporal field is modified with a new instance, thereby creating a modified address. Optionally, in block 115, the document 80/82/84/86 having the new instance is verified by checking to see if it exists when the new instance occurs. If it does not exist then the address is rescanned to look for other temporal field in block 112. Otherwise, in block 116, the modified address is used to retrieve the updated document 80/82/84/86. Optionally in block 115, the new temporal pattern is verified by testing for the presence of the web page on the network without actually pulling the page from the network. In addition, all possible temporal patterns can be pre-calculated using back issue dates (if available) and each tested by verifying for the presence of the respective web page on the network. This eliminates having to wait for the next instance to occur before being able to verify that the correct temporal pattern has been calculated.

Figure 3:
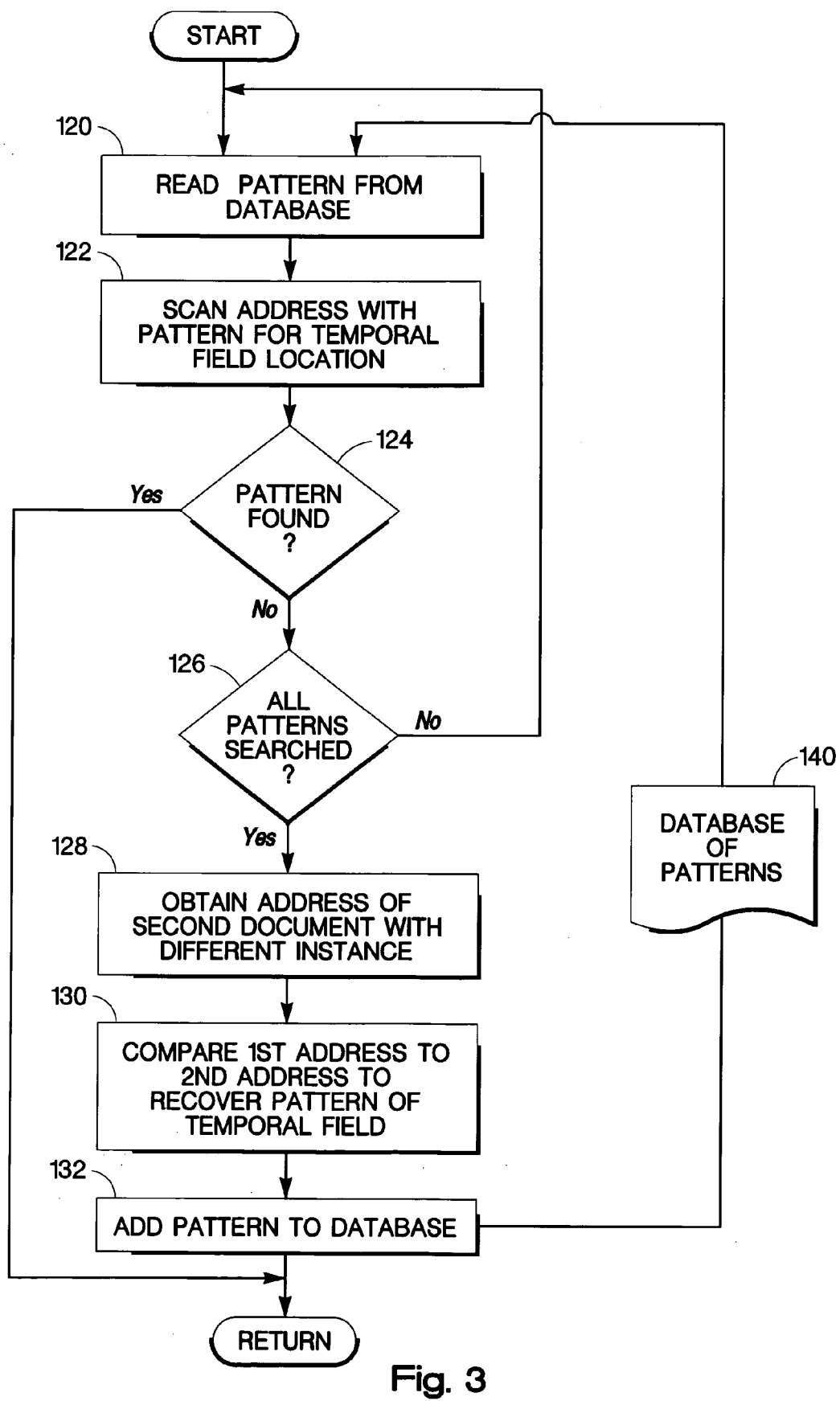
FIG. 3 is an exemplary flow chart for recognizing a temporal field within an address for a document.

FIG. 3 is an exemplary flowchart of block 112 of FIG. 2 in which the temporal field is recognized. Block 140 is a database containing a list of possible temporal patterns which may be used to record datestrings, timestrings, or other temporal markers within the address of the document. In block 120, a pattern is read from the database. In block 122, the address is scanned with the read pattern looking for a match to locate the temporal field. If in block 124, a pattern is found, block 112 of FIG. 2 is completed. However, if the pattern is not found, a check is made in block 126 to determine if all possible patterns within the database 140 have been searched. In not, blocks 120, 122, 124, and 126 are performed again for each additional pattern in the database. If all the patterns in the database 140 have been searched but none have been located within the address, the print scheduler 70 requests a second document address from print manager 60 in block 128. This second document address includes a different instance within the temporal field. The second document is preferably obtained by having the print manager request the user to retrieve an updated web page with a new temporal instance. In block 130, the two addresses are compared to recover the pattern of the temporal field. In block 132, the newly recovered pattern is then added to the database 140 and block 112 of FIG. 2 is exited.

Figure 4:
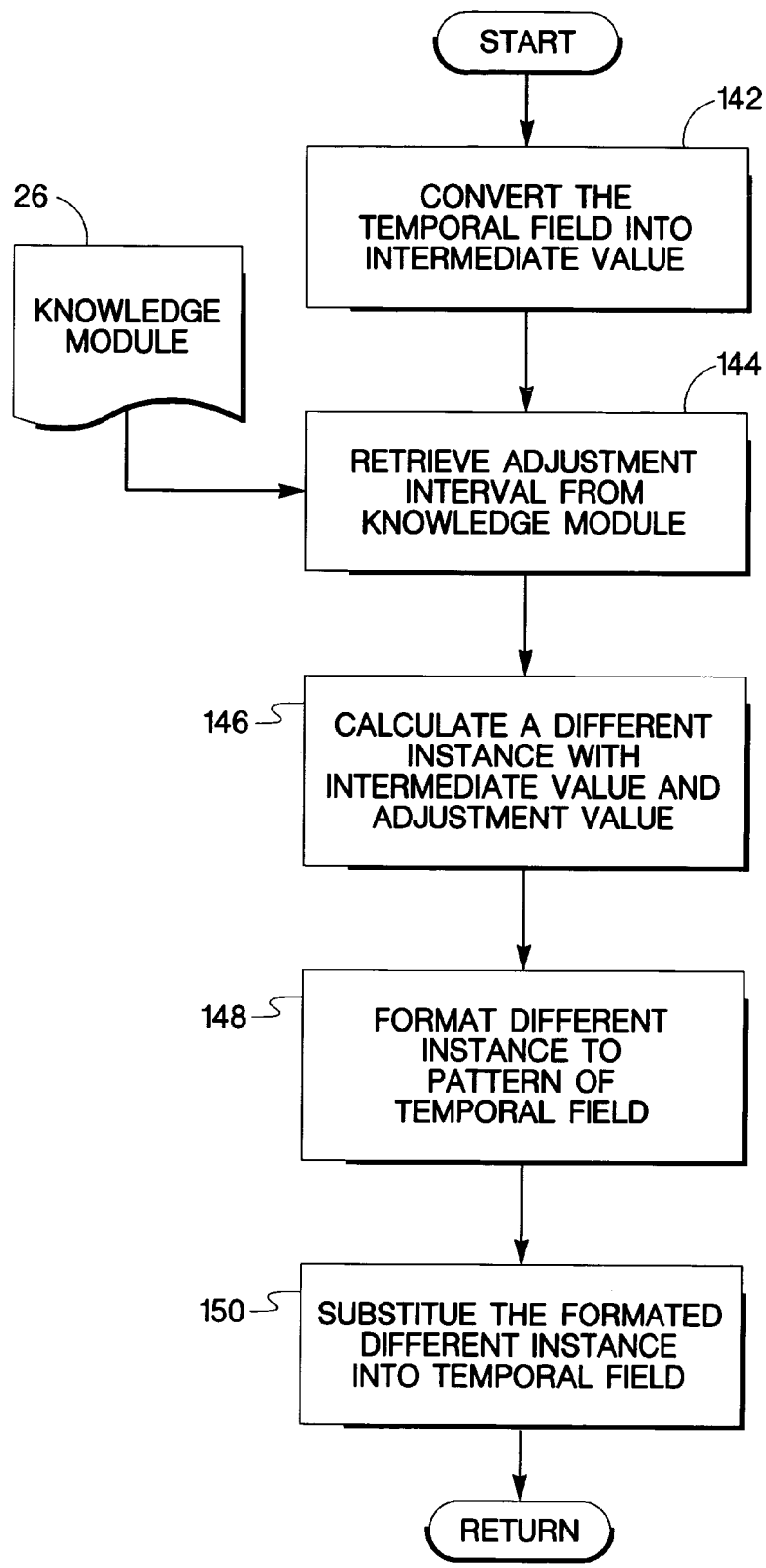
FIG. 4 is an exemplary flow chart for modifying an address to update the temporal field with a new instance.

FIG. 4 is an exemplary flowchart of a process to modify the temporal field of an address with a new instance as described in block 114 of FIG. 2. First, in block 142, the temporal field is converted into an intermediate value. In block 144, the temporal adjustment interval is retrieved from the stored user preferences in the knowledge module 26. In block 146, a different instance is calculated by using the intermediate value and the adjustment value. Then in block 148, the calculated different instance if formatted to fit the pattern of the temporal field. Finally, the formatted different instance is substituted into the temporal field of the address in block 150.

Figure 5:
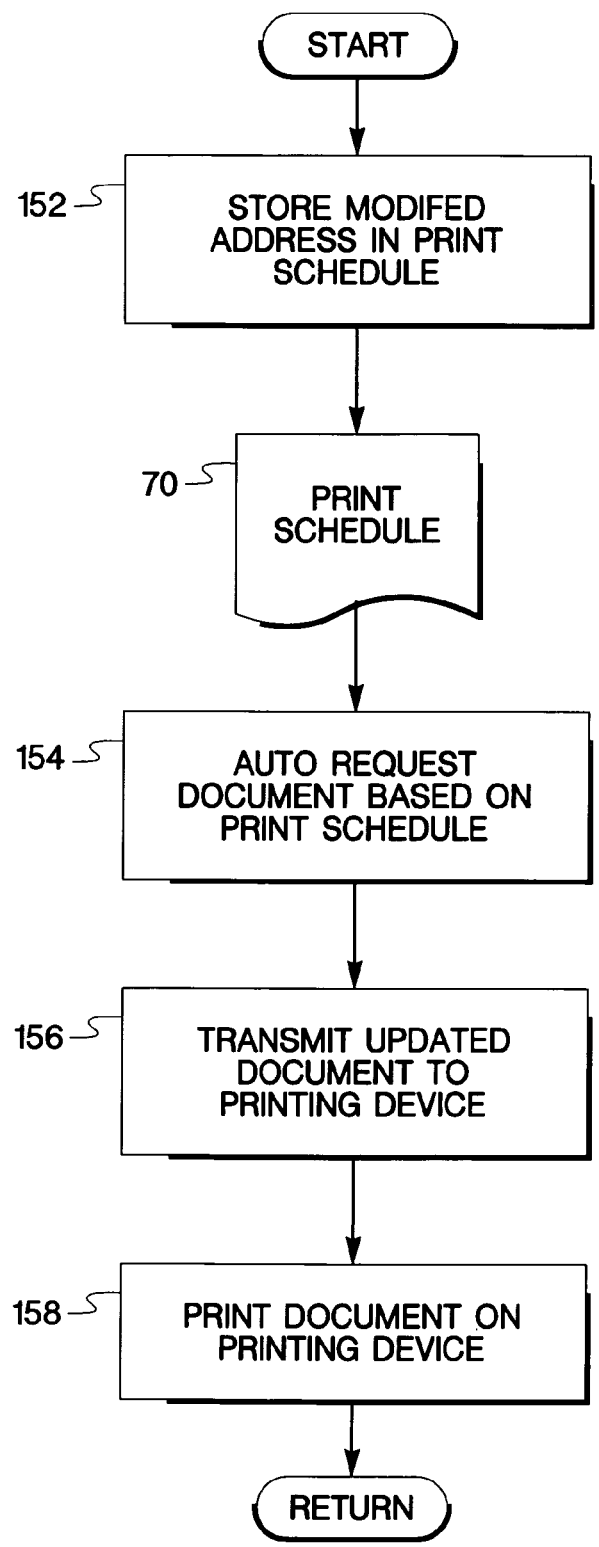
FIG. 5 is an exemplary flow chart for printing an updated document onto a printing device.

FIG. 5 illustrates exemplary steps the print module 60 and the print scheduler 70 perform to print the requested document after it has been retrieved in block 116 of FIG. 2. In block 152, the modified address is stored in the print scheduler 70. In block 154, when the print scheduler 70 determines that the document is to be printed, the document is requested automatically. In block 156, the updated document is transmitted to the printing device 48/50/52/54. The updated document is then printed on the printing device 48/50/52/54 in block 158.

FIG. 6 is an exemplary representation of possible temporal patterns stored in database 140. The temporal patterns may include alphabetic, numeric, or common delimiter characters. Some common delimiters used to separate token intervals within the field are (-) dashes, (/) slashes, (,) commas, and () underscores. The exemplary patterns shown are those representing datestrings but similar patterns for other temporal fields such as timestrings and others can also be included in the database 140. Lower case letters represent number characters. Upper case letters represent alphabetic characters or alphanumeric fields. For the date field shown, "dd," and "DDDD" represents the day, "mm," and "MMMM" the month, and "yy," or "yyyy" the year. An alphanumeric example for "DDDD, MMMM dd, yyyy" is Thurs, Jan. 6, 2000 and for "DDD, dd MMMM, yyyy" is Thurs, 06 Jan., 2000.

By including the ability to dynamically search, calculate, and replace temporal fields found in document address, the capabilities of information services such as HP's Instant Delivery are increased. Further, content providers and other information generators can use the temporal fields within the addresses to simplify the archiving of their documents. For publishing purposes, the ability to print material at periodic temporal intervals such as daily, weekly, or monthly intervals is extremely valuable. By incorporating the ability to modify temporal fields in an address of a document, especially web documents, users of information services, such as Instant Delivery, can better expand and personalize their requested content sources. Further, the ability to archive files based on the temporal fields allows for the ability of information services to fetch "back issues" or retrieve documents which were missed in printing due to such errors as "out of paper", "downed networks", or "broken equipment."

What is claimed is:

1. A method for retrieving a periodically changing document on a document delivery system, comprising the steps of:
   obtaining an address for said document;
   recognizing a temporal field within said address;
   modifying said temporal field of said address to reflect a different instance; and
   retrieving an updated document using the modified address including the steps of:
      storing the modified address in a print schedule;
      automatically requesting, without user intervention, said updated document based on the print schedule;
      transmitting said updated document to a printing device; and
      automatically printing, without user intervention, the document on said printing device.

2. The method of claim 1 wherein said temporal field is a date field.

3. The method of claim 1 wherein said temporal field is a time field.

4. The method of claim 1 wherein said address is a universal resource locator for the Internet.

5. The method of claim 1, wherein the step of recognizing a temporal field comprises the step of sequentially searching said address for a temporal pattern from a database of possible temporal patterns.

6. The method of claim 1 wherein said address is a first address, wherein the step of recognizing a temporal field comprises the steps of:
   obtaining a second address for said document, said second address having different instance of said temporal field;
   comparing said first address to said second address to recognize a pattern of said temporal field; and
   adding said pattern of said temporal field to a database of possible temporal patterns.

7. The method of claim 1, wherein the step of modifying said temporal field further comprises the steps of:
   converting the temporal field into an intermediate value;
   calculating said different instance based on said intermediate value and an adjustment interval;
   formatting said different instance to fit a pattern of said temporal field; and
   substituting the formatted different instance into said temporal field.

8. The method of claim 7 further comprising the step of retrieving said adjustment interval from a knowledge module.

9. An apparatus for periodically retrieving a document having an address, comprising:
   a document server;
   a scheduler coupled to said document server, said scheduler, without user intervention, periodically updating a temporal field in the address of said document wherein said document server retrieves changed documents using updated addresses from said scheduler; and
   a printing device operatively coupled to said document server; wherein said document server automatically transmits, without user intervention, the changed documents to said printing device; and wherein said printing device automatically prints, without user intervention, the changed documents on said printing device.

10. The apparatus of claim 9, wherein said scheduler further comprises:
   a database of patterns of possible temporal fields; and
   a processor sequentially accessing the database of patterns wherein said processor scans said address with the sequentially accessed patterns for said temporal field and wherein upon identifying said temporal field said processor updates said temporal field.

11. The apparatus of claim 9 further comprising a network coupling said document server with said scheduler.

12. The apparatus of claim 11, wherein said network is the Internet.

* * * * *